United States Patent Office 3,413,090
Patented Nov. 26, 1968

3,413,090
PREPARATION OF SILICON NITRIDE WHISKERS
Richard H. Krock, Peabody, and Robert H. Kelsey, West Acton, Mass., assignors to P. R. Mallory & Co., Inc., Indianapolis, Ind., a corporation of Delaware
No Drawing. Filed Mar. 19, 1965, Ser. No. 441,372
12 Claims. (Cl. 23—191)

ABSTRACT OF THE DISCLOSURE

A vapor phase deposition method for producing alpha-silicon nitride whiskers.

The present invention relates to single crystals of silicon nitride, and, more particularly, to single crystal whiskers of alpha-silicon nitride characterized by a nearly perfect crystalline structure.

Certain small crystals of various metals and compounds exhibiting unusually high strength have been discovered and produced. The excellent mechanical properties of these filamentary-type crystals are generally attributed to the lack of structural defects such as dislocations and stacking faults which are usually present in ordinary bulk crystals. Such crystal defects prevent metals and compounds from exhibiting the strength they theoretically should possess—the strength required to separate or shear perfect crystal layers from one another. It has been hypothesized that if a crystal free of structural defects could be produced, it would possess much higher strength than is observed for that substance in bulk form. The aforementioned nearly perfect crystals approach this hypothetical strength and, therefore, should find many uses in industry as reinforcing additives in spring materials, high-temperature members and miniature assemblies and other applications where a high ratio of strength to weight is essential, or where conventional materials are inadequate.

Crystals of this type are usually formed or grown by controlled deposition from the vapor state. Many substances have been crystallized into nearly perfect structures such as iron, copper, silver, cobalt, zinc, aluminum oxide, titanium nitride, zinc oxide and boron carbide.

Needle-like, high-strength almost perfect crystals of several substances have potential applications as additives, and the composites thus formed can be expected to exhibit superior strength or strength-to-weight properties. However, there are but a few such crystals known in the art, the most discussed in the literature being alpha-aluminum oxide. Although alpha-aluminum oxide is an excellent potential reinforcing material, its applications are limited as it is difficult to find a number of materials which will wet the oxide in whisker form and thus result in a composite substance. It has been found that alpha-silicon nitride crystals are also excellent reinforcing materials, and that they have a distinct advantage over alpha-aluminum oxide crystals in that a broader range of metals and materials are capable of wetting the former.

Reference may be made to an article entitled "Reinforcing Effects of Silicon Nitride Whiskers in Silver and Resin Matrices" by N. S. Parratt and published in vol. 1, No. 14 issue of Powder Metallurgy. The use of silver and epoxy resin matrices containing randomly oriented silicon nitride whiskers is described and reinforcing effects noted without the necessity of applying an intermediate coating to the whiskers as required in using alumina whiskers. This article also points out that the silicon nitride whiskers were produced by an experimental technique which was not particularly suitable for large scale, economical production. Nor are there any methods known in the art which can be used to produce almost perfect silicon nitride single crystals which are strong, inexpensive and of high yield. The present invention provides an advance over the art by meeting the aforementioned need.

Therefore, it is an object of the present invention to provide a method of producing practically perfect whiskers of alpha-silicon nitride having thicknesses on the order of 0.1–100 microns.

It is an object of the present invention to provide an improved method of preparing silicon nitride in whisker form.

It is an object of the present invention to provide a method of producing quantities of high-strength silicon nitride whiskers which have high tensile strength and can reinforce a number of materials for high-temperature, high-stress applications.

The present invention, in another of its aspects, relates to novel features of the instrumentalities described herein for teaching the principal object of the invention and to the novel principles employed in the instrumentalities whether or not these features and principles may be used in the said object or in the said field.

Other objects of the present invention and the nature thereof will become apparent from the following description and the appended claims.

Generally speaking, the process which satisfies the objects of the present invention comprises the steps of converting a silicon source material to silicon in the vapor phase, blanketing the surface of the silicon source material and a zone thereabove with an inert atmosphere such as argon, mixing the vaporous silicon with nitrogen or a nitrogen-containing atmosphere whereby a reaction takes place resulting in the formation of silicon nitride crystals in the form of whiskers and ribbons onto refractory substrates. If the silicon source material is not blanketed by a stream of an inert gas, the nitrogen atmosphere will react with the silicon source at its exposed surface generating a layer of silicon nitride which inhibits further vaporization. The resulting low evaporation rate of silicon reduces its concentration in the furnace atmosphere and over the substrates, thus decreasing the yield of whiskers.

The silicon source is not limited to the pure substance, but may be selected from silicon-containing compounds such as the halides, carbonates, metallo-organic compounds of silicon, etc., which yield silicon in the vapor form.

In the practice of the present invention, the silicon source, which for illustrative purposes will be elemental silicon, is charged to a small alumina or refractory boat, and heated to between 1350° C. and 1600° C., although a temperature of 1450° C. has been found best to favor whisker growth. The vaporization is carried out in a flowing dry atmosphere of an inert gas such as argon. The argon is introduced above the silicon source at a rate of 0.1 to 10 cubic feet per hour and serves as both a blanket for the source surface and as an inert carrier. Nitrogen is introduced into the chamber through a separate inlet at a similar rate but observing the precaution that the minimum volume percentage of nitrogen in the chamber necessary to obtain an observable whisker growth is 45–50%. Below that volume percentage, few or no whiskers are obtained. The fiber yield increases with increasing nitrogen concentration up to a maximum volume percentage of about 70%. Concentrations above that value causes silicon nitride to form at the silicon source, inhibiting vaporization of the silicon and drastically reducing the fiber yield. Under the conditions described, practically perfect single crystals of alpha-silicon nitride form. The apparatus used should have provision for the introduction and venting of the reacting gases, such as available on conventional tubular electric resistance furnaces. The charge may be heated in contact with any suitable refractory, such as commercial aluminum oxide.

Commercial quantities of whiskers will require large reactors with increased heater volume for vapor phase reaction at refractory substrates located strategically within the reactors. The overall gas flow rates and vapor phases are the same as those cited in the following examples.

EXAMPLE I

Five grams of elementary silicon were heated in an alumina boat to 1420° C. ±10° C. in a tube furnace. Dry argon was introduced into the furnace at a pressure slightly above one atmosphere, flowing at a rate of about 0.3 cubic feet per hour in such a way that the flowing stream formed an inert blanket over the silicon source and the gas also acted as a carrier to remove the vaporized silicon from the source so that nitride crystals would not form at the surface of the source. Nitrogen was introduced through a separate inlet at a pressure slightly above one atmosphere and at a rate of about 0.3 cubic feet per hour, so that approximately equal proportions of nitrogen an dargon were obtained. After this condition was maintained for 24 hours, alpha-silicon nitride whiskers along with trace amounts of beta-silicon nitride whiskers were found along the rim and edges of the alumina boat and on the mullite combustion tube wall.

EXAMPLE II

A charge of five grams of elementary silicon was heated in a refractory boat to 1420° C. ±10° C. in a tube furnace. Dry argon was introduced into the furnace flowing at a rate of about 0.3 cubic feet per hour in such a way that it did not blanket the silicon source nor did it serve as a carrier to remove the vaporized silicon from the source; it merely provided an inert atmosphere for the reaction. Nitrogen was introduced through a separate inlet at a pressure slightly above one atmosphere and at a rate of about 0.3 cubic feet per hour, so that approximately equal proportions of nitrogen and argon were obtained. After this condition was maintained for 24 hours, a few whiskers of alpha-silicon nitride had formed on the surface of the charge, but most of the charge was unreacted. After a number of experiments, it was concluded that the blanket stream of argon was essential if appreciable quantities of whiskers were to be grown.

The whiskers produced varied in thickness from approximately 0.1 to 100 microns, the majority ranging from 0.5 to 10 microns, and 100 microns to 1 cm. in length. Evaluation of the whiskers has shown remarkable properties when compared with bulk silicon nitride, as shown in the following table.

|  | Bulk $Si_3N_4$ | $Si_3N_4$ whiskers |
| --- | --- | --- |
| Density (gm./cc.) | 3.2 | 3.2 |
| Elastic modulus (p.s.i.) | 35–55×10$^6$ | >55×10$^6$ |
| Tensile strength (p.s.i.) | not >35,000 | >500,000 |

It can be seen that the major advantages of the silicon nitride whiskers over the bulk forms of the same material are the tensile strength, which is at least 12 times that of the bulk forms, and its increased stiffness.

From the foregoing description, it is apparent that the present invention provides a useful process for producing large quantities of perfect whiskers of alpha-silicon nitride in needle and ribbon form suitable for service as strong, light-weight, refractory reinforcements in matrices of ceramic, plastic, or metal.

It is to be understood that all matters as hereinbefore set forth are to be considered as illustrative and not exhaustive in scope, and that all changes and modifications which do not depart from the spirit and scope of the invention are to be included therein.

Having thus described our invention, we claim:

1. A method of producing high strength single crystal whiskers of alpha-silicon nitride comprising providing substantially pure silicon on an alumina substrate, heating said silicon to a temperature of about 1420° C. to vaporize the same, passing argon gas over said silicon at a rate of about 0.3 cubic feet per hour at a pressure slightly above one atmosphere to form an inert blanket over said silicon, introducing nitrogen gas into said blanket at the rate of about 0.3 cubic feet per hour at a pressure slightly above one atmosphere such that about equal proportions of said nitrogen and argon are obtained, said nitrogen gas reacting with said silicon vapor to form said alpha-silicon nitride whiskers, and collecting the so-formed whiskers on said substrate.

2. In a method for producing single crystal alpha-silicon nitride whiskers by heating a silicon source so as to form a substantially pure silicon vapor, and reacting said silicon vapor with nitrogen gas so as to form said alpha-silicon nitride whiskers on a substrate, the improvement comprising:

blanketing, prior to reacting said silicon vapor with said nitrogen gas, said silicon source with an inert gas so as to separate said silicon source from said nitrogen gas so that a reaction between said nitrogen gas and said silicon source is substantially eliminated.

3. A method of producing high-strength single crystal whiskers of alpha-silicon nitride according to claim 2, wherein said silicon source is taken from the group consisting of pure silicon, silicon halides, silicon carbonates, and metallo-organic compounds of silicon.

4. In a method for producing single crystal alpha-silicon nitride whiskers according to claim 2 wherein said inert gas is argon.

5. In a method of producing single crystal alpha-silicon nitride whiskers according to claim 2 wherein the concentration of said nitrogen with respect to said inert blanket is between about 45–70%.

6. In a method of producing single crystal alpha-silicon nitride whiskers according to claim 2 wherein said inert gas and said nitrogen gas are each flowing at the rate of about 0.1 to 10 cubic feet per hour at a pressure slightly above 1 atmosphere.

7. A method of producing high strength single crystal whiskers of alpha-silicon nitride which comprises the steps of providing a chamber having a refractory substrate taken from the group consisting of aluminum oxide and mullite and a source of substantially pure silicon on said substrate, heating said source of silicon to obtain substantially pure silicon in the vapor phase, providing a flowing blanket of inert gas over said source and said substrate, mixing a nitrogen containing gas with said inert blanket and said silicon vapor so as to react said silicon vapor with said nitrogen to form said alpha-silicon nitride whiskers on said substrate.

8. A method of producing high strength single crystal whiskers of alpha-silicon nitride according to claim 7 wherein said inert gas is argon.

9. A method of producing high strength single crystal whiskers of alpha-silicon nitride according to claim 7, wherein said silicon source is heated to a temperature of between 1350° and 1600° C.

10. A method of producing high strength single crystal whiskers of alpha-silicon nitride according to claim 7, wherein said silicon source is heated to a temperature of about 1450° C.

11. A method of producing high strength single crystal whiskers of alpha-silicon nitride according to claim 7, wherein the concentration of said nitrogen with respect to said inert blanket is between about 45–70%.

12. A method of producing high strength single crystal whiskers of alpha-silicon nitride according to claim 7, wherein said inert gas and said nitrogen containing gas are introduced into said chamber at a pressure slightly above about 1 atmosphere at a flow rate of from about 0.1 to 10 cubic feet per hour.

(References on following page)

References Cited

UNITED STATES PATENTS 3,084,998 4/1963 Dess _____ 23—191
3,012,856 12/1961 Berry _____ 23—191
3,226,194 12/1965 Kuntz _____ 23—191

OTHER REFERENCES

Parratt: Reinforcing Effects of Silicon Nitride Whiskers in Silver and Resin Matrices, "Powder Metallurgy," No. 14, vol. No. 7 (1964), pp. 152–154, copy in Scientific Library, TN 695, p. 54.

OSCAR R. VERTIZ, *Primary Examiner.*
H. S. MILLER, *Assistant Examiner.*